United States Patent

Anderson

[15] 3,639,792
[45] Feb. 1, 1972

[54] MOTOR-GENERATOR
[72] Inventor: Robert F. Anderson, St. Louis Park, Minn.
[73] Assignee: Electro-Craft Corporation, Hopkins, Minn.
[22] Filed: Dec. 28, 1970
[21] Appl. No.: 101,759

[52] U.S. Cl.........................................310/113, 310/191
[51] Int. Cl. ...................................................H02k 47/20
[58] Field of Search.................310/112, 113, 141, 148, 191, 310/241

[56] References Cited

UNITED STATES PATENTS 2,800,619   7/1957   Brunt..............................310/241 X
3,114,852   12/1963   Cook....................................310/191

Primary Examiner—D. X. Sliney
Attorney—Carlsen, Carlsen & Sturm

[57] ABSTRACT

The armatures and commutators of a DC motor and a DC generator are mounted coaxially on a common shaft with the two commutators being positioned adjacent to each other between the two armatures. The commutators are enclosed by a nonmagnetic housing containing brushes for making electrical contact therewith. Each of the armatures are enclosed by a corresponding housing containing field magnets therefor. The brushes are mounted in a fixed position on the nonmagnetic housing, and the housings containing field magnets are rotatably attached to opposite ends of the housing containing the brushes so that the field magnets can be aligned relative to their respective brushes for commutation along a neutral axis and for minimizing electromagnetic interaction between the motor and the generator.

8 Claims, 7 Drawing Figures

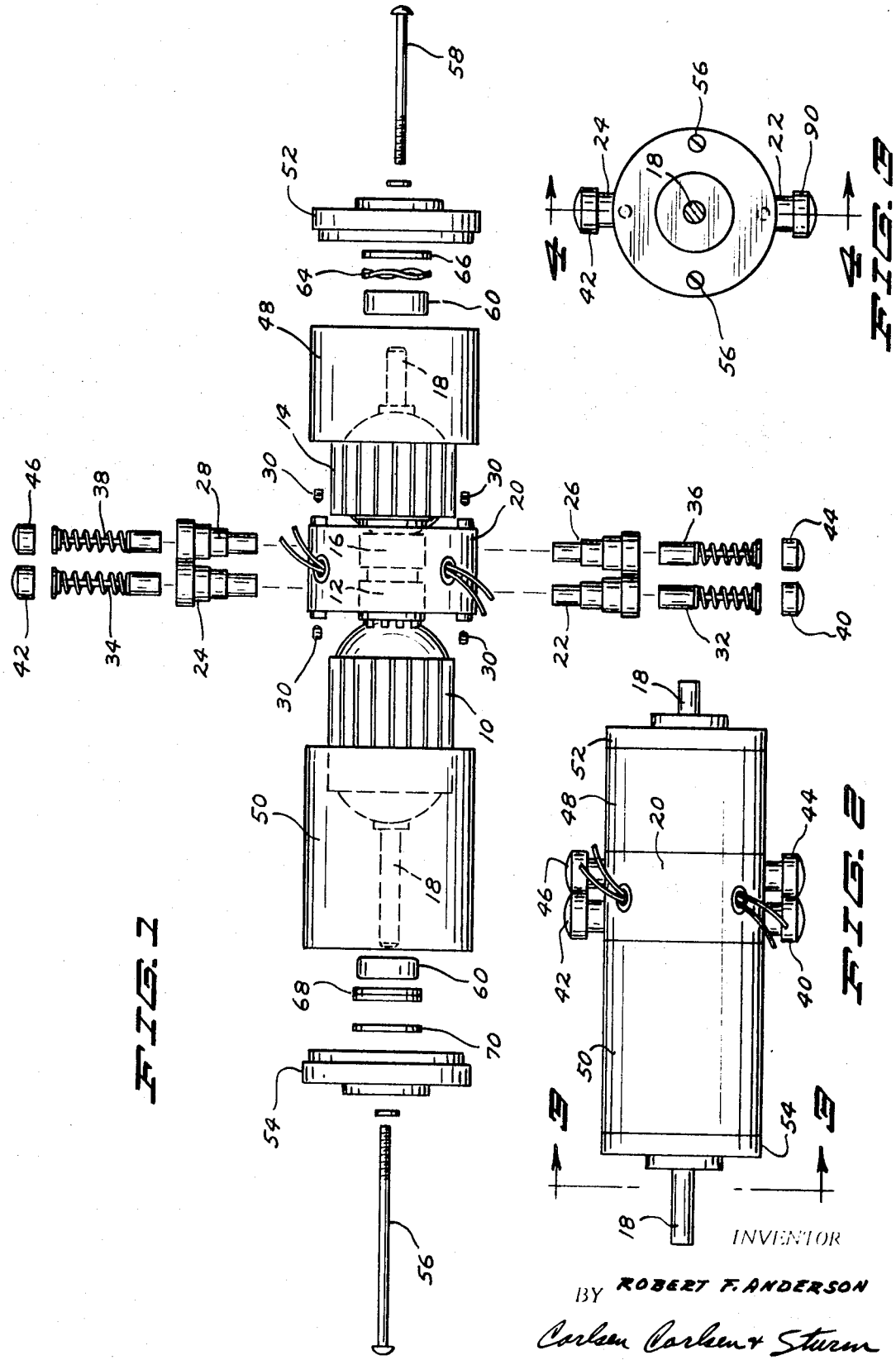

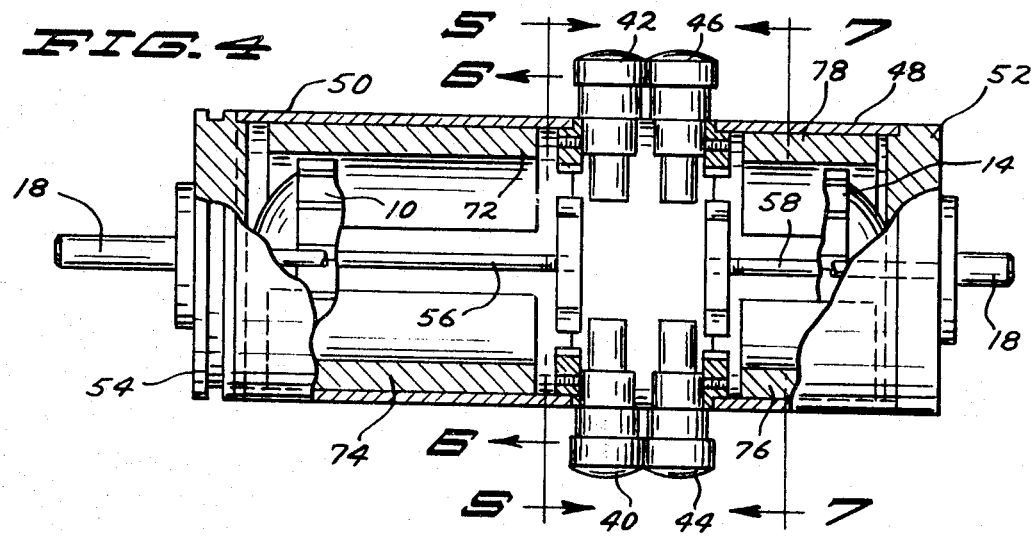
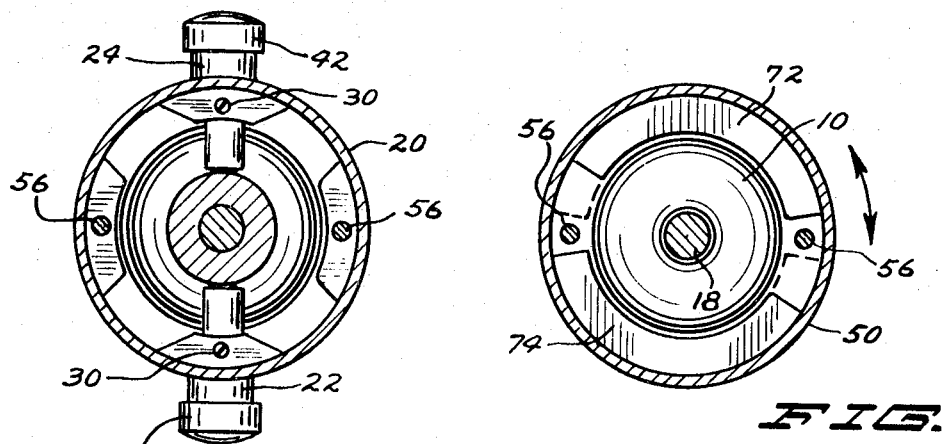
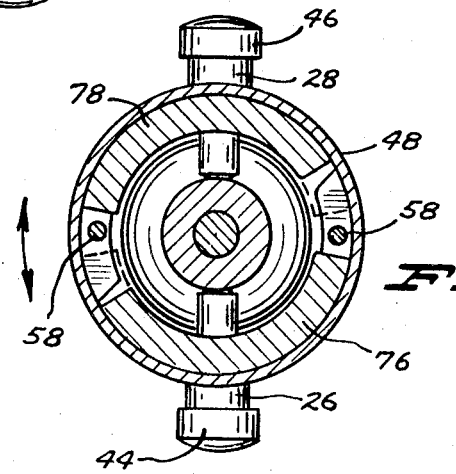
INVENTOR
ROBERT F. ANDERSON
BY Carlsen Carlsen + Sturm
ATTORNEYS

MOTOR-GENERATOR

BACKGROUND OF THE INVENTION

This invention relates to DC motor/generators in which a DC motor and a DC generator are mounted together on a common shaft. Many different types of such DC motor/generators have been made in the past, but all have suffered from the disadvantage of having a relatively high level of ripple present in the generator output voltage due to electromagnetic interaction between the motor and the generator circuits. This problem is particularly troublesome in small motor/generators which are mounted together in a common housing. Accordingly, the principal object of this invention is to provide an improved DC motor/generator having a novel housing configuration which minimizes electromagnetic interaction between the motor and generator circuits without increasing the weight or size of the unit. Another object of this invention is to provide an improved DC motor/generator of the above-noted type which is relatively simple and sturdy in construction and reliable in operation.

SUMMARY OF THE INVENTION

In accordance with this invention it has been discovered that the above-noted objects can be attained by mounting the armatures and commutators coaxially on a common shaft with the two commutators positioned adjacent to each other between the two armatures. The commutators are enclosed by a nonmagnetic housing containing brushes for making electrical contact therewith. Each of the armatures are enclosed by a corresponding housing containing field magnets therefor. The brushes are mounted in a fixed position on the nonmagnetic housing, and the housings containing field magnets are rotatably attached to opposite ends of the housing containing the brushes so that the field magnets can be aligned relative to their respective brushes for commutation along a neutral axis and for minimizing electromagnetic interaction between the motor and generator.

DESCRIPTION OF THE DRAWINGS

FIG. 1 is an exploded plan view of one illustrative embodiment of the invention.

FIG. 2 is a plan view of the embodiment of FIG. 1 in its assembled form.

FIG. 3 is an end view taken on the plane 3—3 of FIG. 2.

FIG. 4 is an axial cross-sectional view taken on the plane 4—4 of FIG. 3.

FIG. 5 is a radial cross-sectional view taken on the plane 5—5 of FIG. 4.

FIG. 6 is a radial cross-sectional view taken on the plane 6—6 of FIG. 4.

FIG. 7 is a radial cross-sectional view taken on the plane 7—7 of FIG. 4.

DETAILED DESCRIPTION OF THE INVENTION

FIG. 1 shows an exploded plan view of one illustrative embodiment of the invention containing a DC motor armature 10, a DC motor commutator 12, a DC generator armature 14, and a DC generator commutator 16, all of which are coaxially mounted on a common shaft 18. The commutators 12 and 16 are mounted adjacent to each other and are enclosed by a nonmagnetic central housing member 20 which is adapted to receive motor brush holders 22 and 24 and generator brush holders 26 and 28. The brush holders 22-28 are held in place by set screws 30 and receive spring-loaded brush elements 32-38 which are held in contact with the corresponding commutator by brush caps 40-48. Electrical conductors enter the housing 20 through openings which are lined with insulating grommets for attachment to brushes 32-38. In this particular embodiment of the invention, the central housing member 20 is made of cast aluminum and is adapted on either end to receive armature housings 48 and 50, which contain the field magnets for the generator armature and motor armature respectively. The outer ends of housings 48 and 50 are covered by end plates 52 and 54, which are held in place by bolts 56 and 58. The shaft 18 is journaled between end plates 52 and 54 by means of bearings 60 and 62, which fit in recessed portions of the end plates 52 and 54. Bearing 62 is held in place by a spring washer 64 and a snapring 66. Bearing 60 is held in place by a shim 68 and a snapring 70.

The armature housings 48 and 50 are made of a magnetic material and serve as supports for radially magnetized semicylindrical field magnets 72 and 74 (FIG. 6), which provide the fixed magnetic field for motor armature 10, and radially magnetized semicylindrical field magnets 76 and 78, which provide the fixed magnetic field for generator armature 14. The bolts 56 and 58 which secure the end pieces 52 and 54 to their respective housings 48 and 50 pass through the open space which separate magnets 72 and 74 and 76 and 78 respectively and engage in screw threads formed in central housing 20, as best shown in FIGS. 5, 6, and 7. Accordingly, when the bolts 56 and 58 are loosened, the housings 48 and 50 and their respective field magnets can be rotated through an angle of approximately 30° with respect to the brush holders mounted on the central nonmagnetic housing 20. The dashed lines in FIGS. 6 and 7 indicate the amount of angular adjustment that can be obtained before the bolts 56 and 58 make contact with the ends of their respective magnets.

The individual components of the above-described embodiment are not new per se, but their geometric configuration is new and has been found to be particularly effective in reducing the percentage of ripple in the output voltage of the generator. This is done by angularly adjusting the two housings 48 and 50 with respect to the central housing 20 for a minimum of ripple voltage in the output of the generator. Since the central housing 20 is made of a nonmagnetic material, it does not cause any distortion of the magnetic fields of the two field magnets and allows the magnetic fields to be rotated freely with respect to the brushes and with respect to each other. After the position which produces the least ripple voltage has been found, the housings are locked in place by tightening bolts 56 and 58.

In order to balance the electromagnetic fields in housing 20 for minimum interaction between the motor and generator circuits, the two commutators 12 and 16 are symmetrical with respect to their conducting and nonconducting segments, i.e., they have the same number of segments and the segments of one commutator are equal in size to the same type of segment on the other commutator. Moreover, the segments of the two commutators are aligned with each other and the brush holders are also aligned with each other so that current pulses will occur simultaneously in the motor and generator circuits with a minimum of overlap. The armatures 10 and 14 are also symmetrical with respect to their windings and construction for the same reason. The polarity of the brushes for the motor and generator is arranged so that current flow is in opposite directions through adjacent brushes. These features all help in the reduction of electromagnetic interaction between the motor and generator circuit and taken together they produce a reduction of approximately 20 percent in the generator output ripple voltage.

From the foregoing description it will be apparent that this invention provides an improved DC motor/generator having a novel housing configuration which minimizes electromagnetic interaction between the motor and generator circuits without increasing the weight or size of the unit. And although this invention has been described in connection with one illustrative embodiment thereof, it should be understood that the invention is not limited to the disclosed embodiment, since many modifications can be made in the disclosed structure without altering its basic principle of operation. Accordingly, this invention includes all modifications falling within the scope of the following claims:

I claim:

1. A motor/generator comprising a motor armature, a motor commutator, a generator armature, and a generator commutator mounted coaxially upon a common shaft with said commutators mounted adjacent to each other between said armatures, a commutator housing surrounding said commutators, said commutator housing being made of a nonmagnetic material, a plurality of brushes mounted in fixed positions on said commutator housing for making electrical contact with said commutators, a motor housing surrounding said motor armature, a motor field magnet attached to the interior of said motor housing, said motor housing and field magnet being attached to one end of said commutator housing and being rotatable with respect to said commutator housing so that the magnetic field of said field magnet can be angularly aligned with respect to said brushes, a generator housing surrounding said generator armature, a generator field magnet attached to the interior of said generator housing, said generator housing and field magnet being attached to the other end of said commutator housing and being rotatable with respect to said commutator housing so that the magnetic field of said field magnet can be angularly aligned with respect to said brushes.

2. A motor/generator as defined in claim 1 wherein said motor commutator and generator commutator are symmetrically aligned with respect to each other to minimize electromagnetic interaction between the motor and generator circuits.

3. A motor/generator as defined in claim 2 wherein said plurality of brushes comprises at least two brushed for making electrical contact with said motor commutator and at least two brushes for making electrical contact with said generator armature.

4. A motor/generator as defined in claim 3 wherein said motor commutator brushes and generator commutator brushes are symmetrically aligned with respect to each other to minimize electromagnetic interaction between the motor and generator circuits.

5. A motor/generator as defined in claim 4 wherein said motor armature and generator armature are symmetrically aligned with respect to each other to minimize electromagnetic interaction between the motor and generator circuits.

6. A motor/generator as defined in claim 5 and also comprising means for applying a DC voltage across said motor brushes to induce rotation of said motor and generator armatures and thereby to develop a DC output voltage across said generator brushes, the polarity of said two DC voltages being arranged to minimize electromagnetic interaction between the motor and generator circuits.

7. A motor/generator as defined in claim 6 wherein said motor brushes and generator brushes are angularly aligned with each other and wherein the polarity of said DC voltages is arranged to produce current flow in opposite directions between adjacent motor and generator brushes.

8. A motor/generator as defined in claim 7 wherein said commutator housing is made of cast aluminum.

* * * * *